Dec. 7, 1954   E. L. MOBLEY ET AL   2,696,024
METHOD FOR ROTATIONAL CASTING OF HOLLOW ARTICLES
Filed Jan. 28, 1953   4 Sheets-Sheet 1

*INVENTORS*
EDWARD L. MOBLEY &
ROBERT P. MOLITOR
BY Ely, Frye & Hamilton
ATTORNEYS Dec. 7, 1954   E. L. MOBLEY ET AL   2,696,024
METHOD FOR ROTATIONAL CASTING OF HOLLOW ARTICLES
Filed Jan. 28, 1953   4 Sheets-Sheet 2

INVENTORS
EDWARD L. MOBLEY &
ROBERT P. MOLITOR
BY
ATTORNEYS

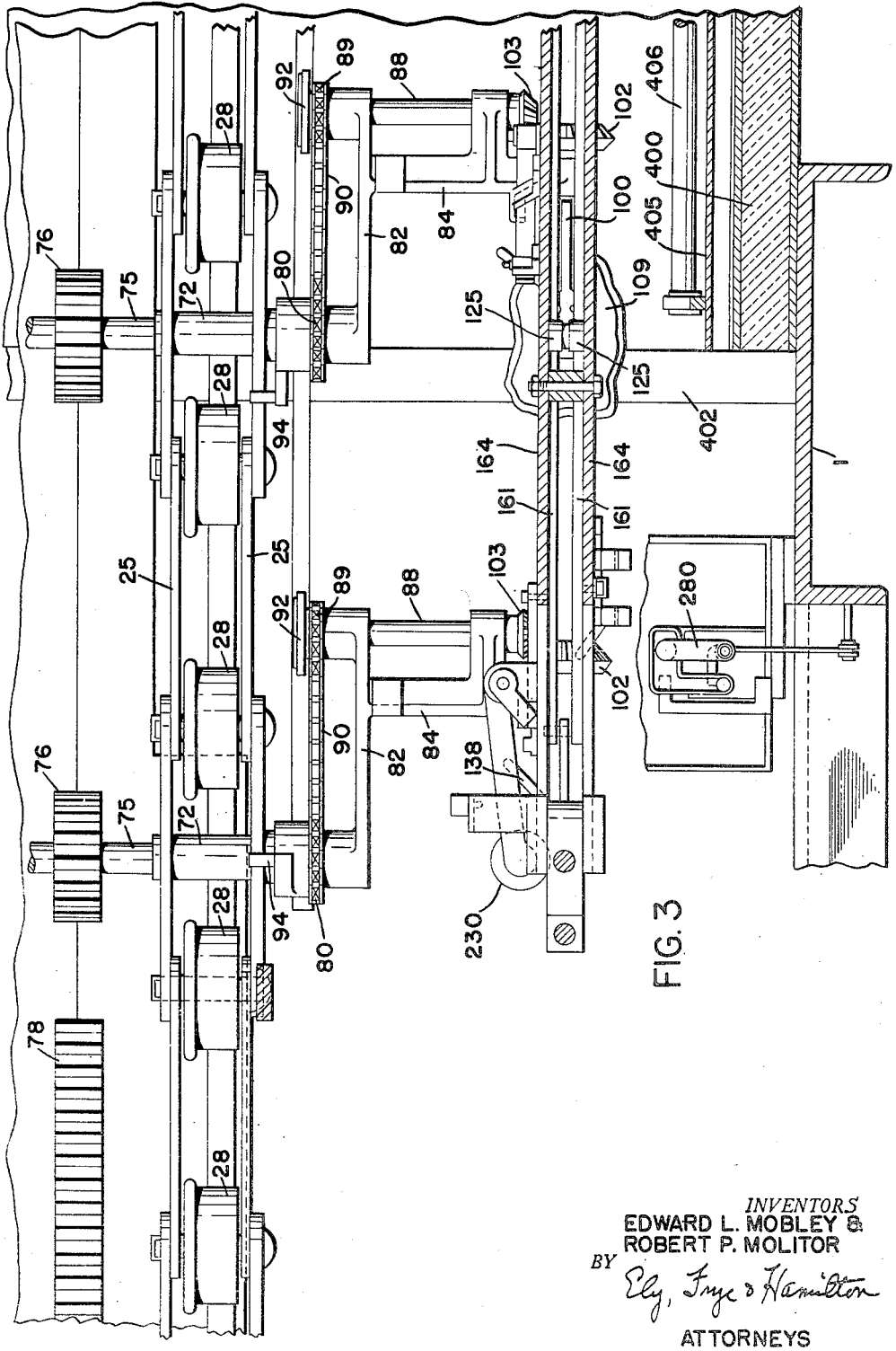

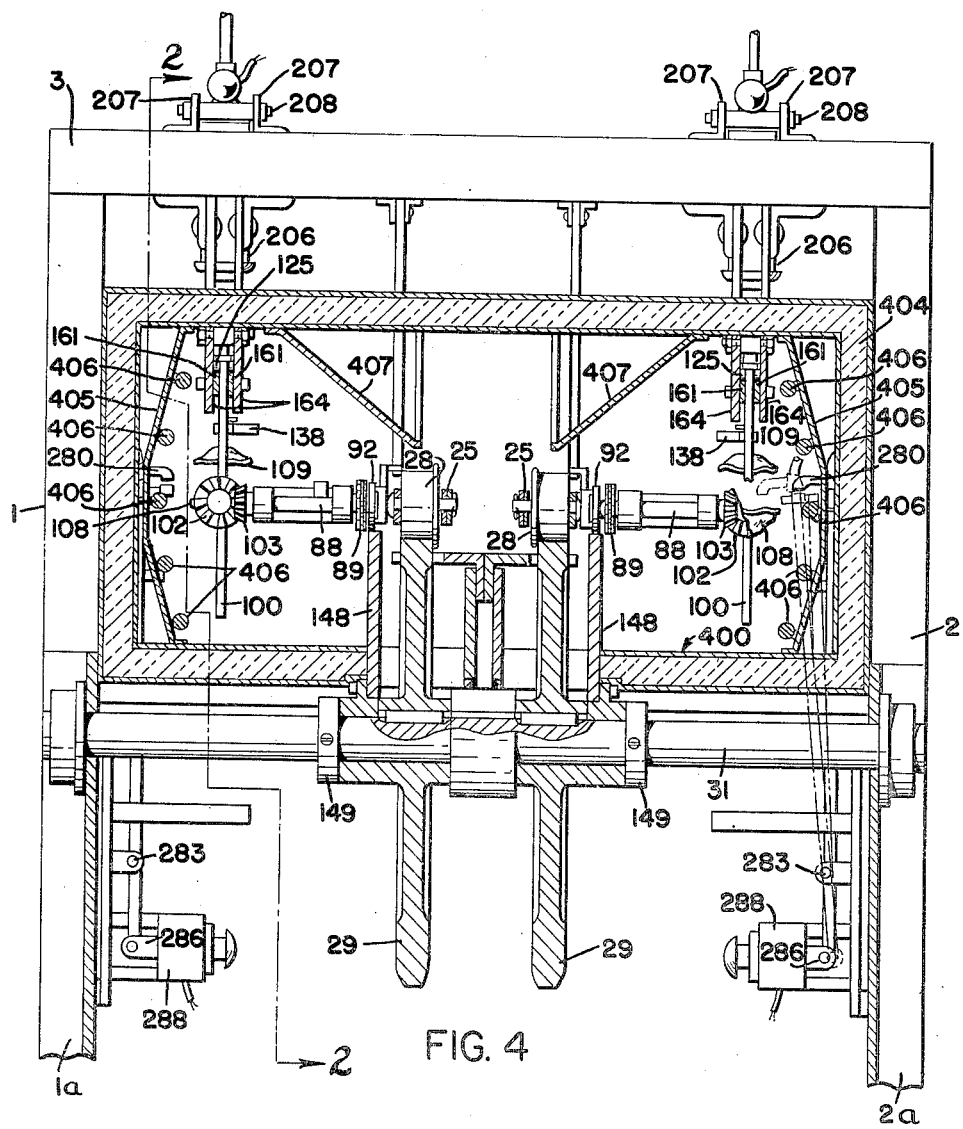

United States Patent Office 2,696,024
Patented Dec. 7, 1954

2,696,024

METHOD FOR ROTATIONAL CASTING OF HOLLOW ARTICLES

Edward L. Mobley and Robert P. Molitor, Akron, Ohio, assignors to The Sun Rubber Company, Barberton, Ohio, a corporation of Ohio Application January 28, 1953, Serial No. 333,796

7 Claims. (Cl. 18—58.3)

The invention relates generally to a method for manufacturing hollow flexible articles from plastic synthetic resins and the like, and particularly from thermal-setting resins such as vinyl polymers and copolymers. Vinyl chloride polymer, when properly compounded with suitable plasticizers and other ingredients, is especially adapted for the manufacture of dolls, figure toys and similar hollow articles, and a method of manufacturing such articles from thermal-setting thermo-plastic resins such as vinyl chloride polymer is disclosed in the copending application of Robert P. Molitor, Serial No. 170,515, filed June 27, 1950, now Patent No. 2,629,134, issued February 24, 1953.

The method of said application comprises loading a hollow mold with a measured charge of the liquid plastic material, closing the mold and rotating it in a plurality of planes so that the material uniformly covers the interior of the mold, and passing the mold while rotating through a heating zone to heat the mold to the fusing temperature of the plastic material. As the mold is brought up to the fusing temperature, the liquid plastic first gels in a shell of uniform thickness on the interior of the mold and then fuses. The mold is then cooled and opened and the hollow cast article removed.

The foregoing method has been satisfactorily practiced in actual production to continuously produce hollow articles of vinyl polymers and similar thermal-setting plastic material, by using the internal casting apparatus disclosed in the copending application of Henry Martin and Paul Rekettye, Serial No. 179,726, filed August 16, 1950, now Patent No. 2,629,131, issued February 24, 1953. In this apparatus, after each mold or matrix has been filled with a measured charge of the liquid plastic material, it is closed by the impact of a pneumatic hammer and then clamped to press and hold the edges of the matrix sections in tight sealing contact around the parting line. Nevertheless, when the matrices are opened after cooling, there is a thin flash of plastic material extending around the articles at the parting line, and the removal of this flash is a hand peeling operation which consumes excessive time and labor.

The main purpose of the present invention is to provide improvements upon the method for casting hollow flexible articles from thermal-setting plastic materials whereby improved articles with substantially no flash are obtained, thus eliminating the hand peeling operation.

This purpose is accomplished without requiring excessive closing or clamping pressure on the matrix sections, and without changing the conditions under which they are closed and clamped together. The articles produced according to the present invention are uniform throughout, of proper texture and elasticity, and with a minimum of rejects and seconds. The drawings depict an apparatus for continuous rotational casting patterned after the apparatus of said Patent No. 2,629,131, but modified in order to carry out the improved method of the present invention. Variations in the method and apparatus herein disclosed may be made within the scope of the invention as defined in the appended claims.

Referring to the drawings:

Fig. 3 is an enlarged plan section, as on line 3—3, Fig. 2; and

Fig. 4 is a transverse sectional view as on line 4—4, Fig. 2.

Figure 1:
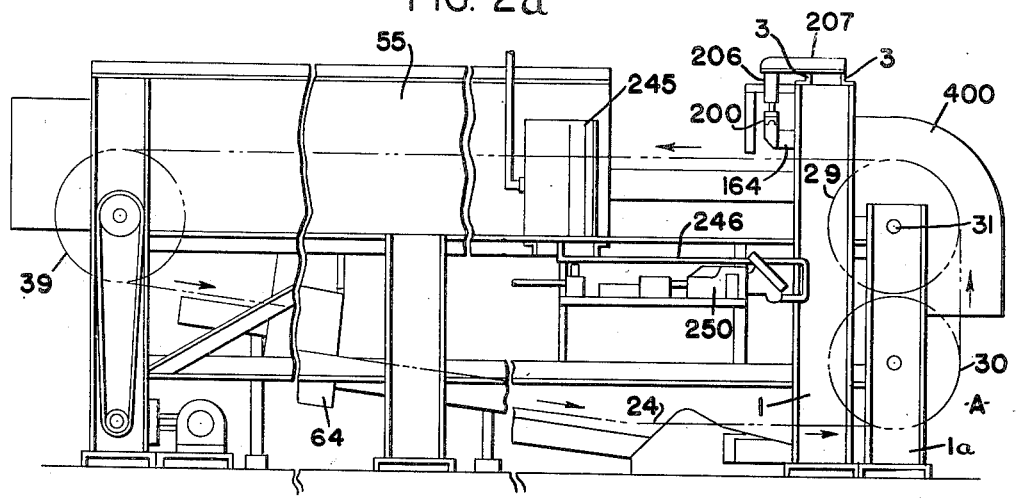
Fig. 1 is a schematic side elevation of a complete apparatus for continuously casting hollow articles according to the present invention, the loading end being at the right.

The apparatus shown and described herein is a duplex machine similar to the machine shown and described in detail in Patent No. 2,629,131, in which two series of molds are carried on each side of an endless conveyor chain, but a single set of molds may be used. The general operation of the present machine is much the same as in the former application. Referring to Fig. 1, the conveyor chain 24 is indicated in dot-dash lines with arrows showing its direction of travel. The molds are unloaded by the operator at station A in front of the lower sprocket 30, and then pass upwardly over the upper sprocket 29. The hammer applying closing pressure to the matrix sections of each mold is indicated at 200, having the air cylinder 206, which is pivoted at 208 to a bracket 207 supported on the upper cross beams 3. Between the sprocket 29 and hammer 200, the mold is loaded with a measured charge of the liquid plastic material. The plastic material is stored in a tank 245 and led through pipe 246 to a pump 250 from which it is pumped to a mold filling nozzle 280 (Fig. 3) located slightly in advance of the hammer 200.

Immediately after the molds are closed by the hammer they begin to rotate in a compound manner in order to distribute the liquid casting material uniformly over the interior of the matrix, and while the molds continue to rotate they pass into a fusing tunnel 55 where they are heated to the fusing temperature of the casting material. The molds pass out of the fusing oven over the driving sprocket 39, and on the return run the molds pass through a cooling chamber 64, to cool the molds well below the fusing temperature of the casting material before they are opened and the cast articles removed at station A.

Figure 2A:
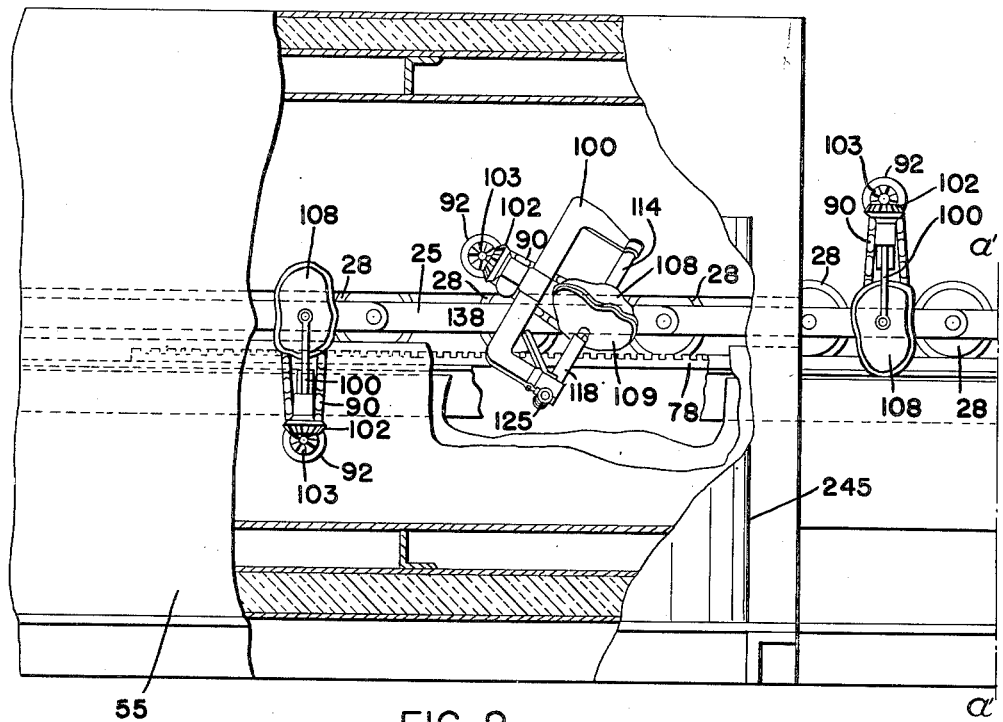
Fig. 2a is an extension leftward of Fig. 2 from the line a—a.
Figure 2:
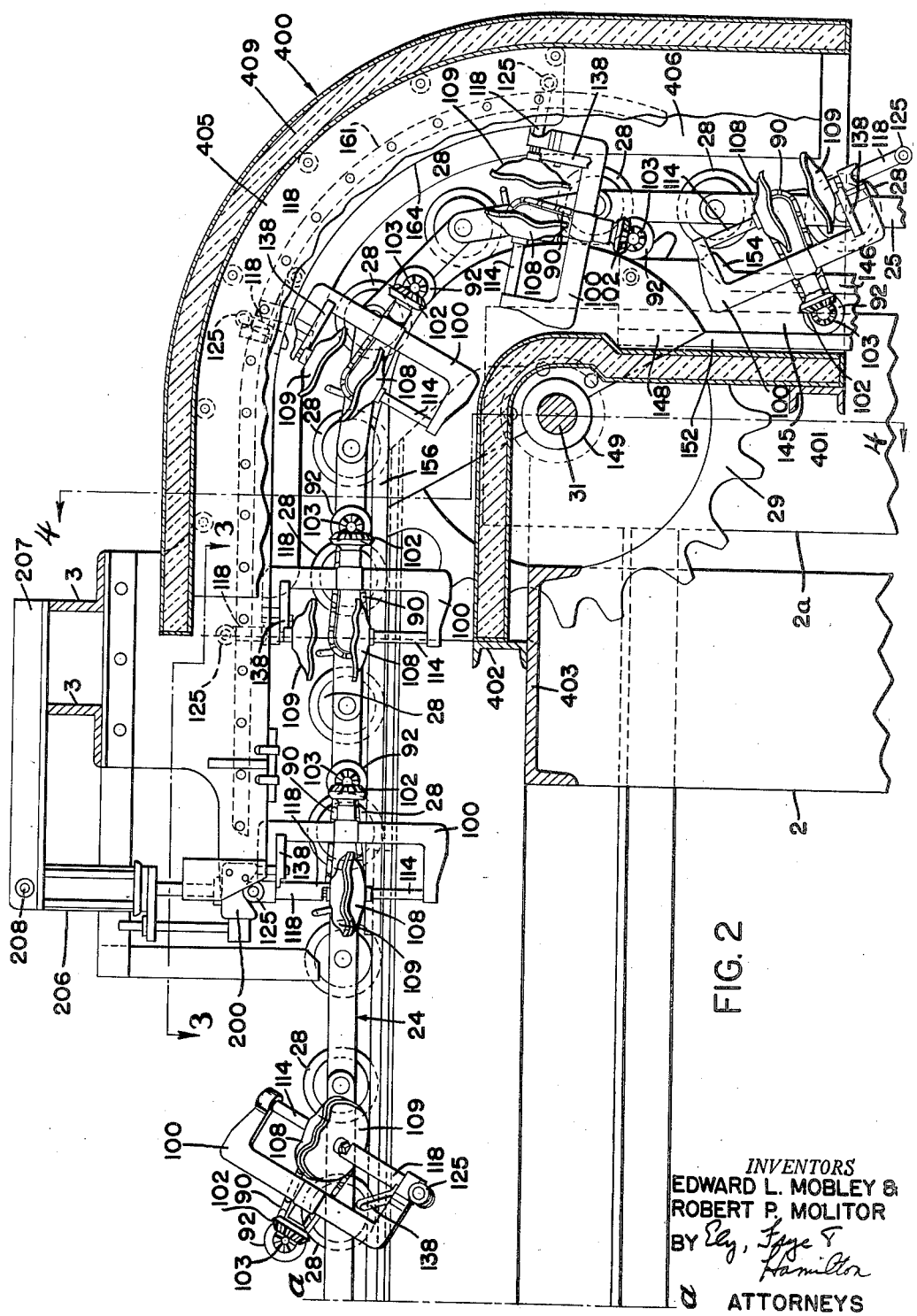
Fig. 2 is an enlarged vertical section on line 2—2, Fig. 4, of the upper part of the loading end of the apparatus.

Referring to Fig. 2, the lowermost mold is shown just as it leaves the unloading station A and moves upwardly as the chain 25 passes over the upper sprocket 29. The mold sections 108 and 109 are carried on a yoke 100, the section 109 being movable toward and away from section 108. Each of the yokes 100 is rotatably mounted on the side arm 84 of a crank arm 82 (Fig. 3), which is fixed on a shaft 75, and the shafts 75 are journaled in bearing sleeves 72 carried by the links 25 between chain rollers 28, there being pinions 76 on the shafts 75 for meshing with a rack 78 to rotate the crank arm 82.

In order to effect a compound rotation of the mold, a sprocket 80 journaled on shaft 75 is connected by a chain 90 to a sprocket 89 on a shaft 88 which is operatively connected to the yoke 100 by bevel gears 102 and 103. As the arm 82 is rotated the chain 90 rotates the yoke on the axis of bevel gear 102. A pin 94 projects inwardly from each sprocket 80 and strikes the conveyer chain 25 to hold the sprocket 80 stationary so that as the arm 82 rotates in a vertical plane about the shaft 75 the chain will drive the shaft 88 and rotate the yoke. A roller 92 on the inner end of shaft 88 serves to hold the crank arm 82 from rotating about the shaft 75 at certain times during the travel of the conveyer.

The matrix sections 108 and 109 may be made in many different forms for forming all sorts of articles having irregular contours with uniform wall thickness throughout, and the matrices are interchangeable so that different articles may be produced in the machine simply by changing the matrices. Preferably, the matrices are made of metal such as copper or steel, copper or bronze plated on its interior surfaces and exteriorly coated with a dark-heat-absorbing coating. The parting line of each matrix preferably follows the contour of the article at its widest parts, making a fairly equal division between the two matrix sections.

The matrix section 108 may be called the lower section and is stationarily mounted on the yoke 100 by a spindle 114. Section 108 receives the charge of casting material from the nozzle 280 as it swings inwardly about the pivot 283 due to actuation of its lower end by armature 286 of solenoid 288. The upper section 109 is movable on the yoke and is held in raised position, as shown to the right in Fig. 2, until after the charge is received in lower section 108, whereupon it is closed by the hammer 200 and locked before the pinion 76 of the matrix supporting unit engages the rack 78 and starts to revolve. The movable section 109 is mounted on the lower end of a sliding bar 118 which is slidably mounted in an enlargement in the arm of the yoke 100 opposite the point of attachment of the fixed section 108. On the outer end of bar 118 rollers 125 are journaled for engaging rails 161 to open and hold the section 109 in raised position until after the charge is introduced into the section 108. The rollers 125 also receive the blow of the hammer 200, which brings the two matrix sections into tight fitting relation before the matrix starts to rotate.

Referring again to Fig. 2, as the matrices move upwardly from the unloading station A, the rollers 92 pass along a cam track formed by a plate 145 and rails 146 and 152. At the top of the cam track the rail 146 flares outwardly, as shown at 154, and the upwardly moving rollers 92 strike the edge of a semi-circular plate 148 which becomes the guiding cam and turns the yokes 100 to upright position with crank arms extending to the rear. The plate 148 also causes the rollers to follow the rails 161 to hold the sections 109 in raised position as they swing to upright position. The rails 161 on each side of the conveyer are secured to two plates 164 having arcuate portions concentric to the edge of plate 148 and being supported at their upper ends on cross beams 3. As the rollers reach the top of plate 148 they pass onto a supplemental track section 156 secured to the plate, which holds the yokes in their upright positions during the loading and matrix closing operations. When the rollers 125 drop off the ends of rails 161, the upper matrix section 109 drops by gravity to closed position, whereupon the hammer 200 is actuated to strike downwardly on the rollers 125 and the locking lever 138 clamps the sections 108 and 109 tightly together.

The construction and operation of the mechanism for guiding, closing, locking, rotating and opening the matrices during the complete cycle of their travel through the machine is described in detail in said Patent No. 2,629,131, and such mechanism per se forms no part of the present invention but is incorporated in the present application by reference. For the purpose of this invention the conveyer is extended forwardly of the machine of the former patent by providing additional upright frame members 1a and 2a in front of the frame members 1 and 2, and mounting the sprockets 29 and 30 in said uprights 1a and 2a instead of in uprights 1 and 2 as in the former application.

The semi-circular plate 148 is bolted to a sleeve 149 loosely surrounding the shaft 31 of the sprocket 29, and the track section 156 extends from the plate 148 horizontally to a point just beyond the hammer. Thus the horizontal run of the conveyer between the sprocket 29 and the hammer 200 is extended as compared with the apparatus of said patent.

A preheating chamber or tunnel 400 is provided surrounding a portion of the conveyer extending around the sprocket 29, including the quadrant engaging the sprocket together with adjoining vertical and horizontal portions. As indicated in Fig. 2, the tunnel 400 may be supported at its lower end on a cross member 401 extending between the uprights 1a and 2a, and at its upper rear end on a cross channel 402 carried on cross member 403. The tunnel 400 has an intermediate arcuate portion closely following the curve of the outer edges of plates 164, and the walls 404 of the tunnel are thoroughly insulated similarly to the walls of the fusing tunnel 55.

The sides of the tunnel 400 are provided interiorly with polished reflector plates 405 partly surrounding the matrices and supporting electrical heating units 406. Additional reflector plates 407 may be provided extending angularly inward from the front and top wall of the tunnel for concentrating the heat from the elements around the matrices, and the plates 407, together with plates 148, serve to divide the preheating chamber into two side-by-side tunnels surrounding each series of matrices passing therethrough. The developed length of the preheating tunnel is such that the heating elements 406 therein will bring the matrices up to a temperature somewhat above the gelling temperature of the liquid casting material but substantially below its fusing temperature, by the time the matrices reach the nozzle 280 where they are charged.

For example, if the liquid casting material is compounded from a vinyl chloride polymer with suitable plasticizers such as disclosed in the Molitor Patent No. 2,629,134, it may require a gelling temperature of 200° to 220° F., and a fusing temperature of about 350° F., and the matrices should be preheated in the tunnel 400 to approximately 200° to 260° F., which means raising their temperature in the preheating chamber 50°–110° above the unloading temperature of about 150° at station A. This allows for some slight cooling of the matrices due to charging and during their travel from the time they are charged until they reach the fusing oven, without dropping below the gelling temperature.

We have discovered that by preheating the matrices to or slightly above the gelling temperature of the casting material, and then rotating them immediately after charging long enough to completely gel the entire charge before subjecting them to the higher fusing temperature, the production of flash on the finished articles is substantially entirely eliminated. Accordingly, referring to Figs. 2 and 2a, the matrices are rotated immediately after being closed by the hammer for a substantial period of time as they travel horizontally to or into the fusing oven 55, and the distance from the hammer to the front end of the oven or to the fusing zone of the oven is calculated so that the casting material will have substantially completely gelled into a wall distributed uniformly over the interior of the matrix sections before the temperature of the matrix is materially raised by the fusing oven, which may be maintained at approximately 700° F.

We believe that by completely gelling the casting material into a uniformly thick wall before subjecting the molds to the high fusing heat, the gelled wall has sufficient strength to resist and contain the pressure generated within the matrix by the fusing heat, so that said pressure does not force a film of the casting material outwardly at the parting line between the matrix sections and form a flash around the molded article.

The saving in time and labor previously consumed in removing such flash by hand is tremendous, thereby increasing production and greatly reducing manufacturing costs.

While we have given approximate temperatures for preheating vinyl chloride polymer by way of example, it will be understood that the preheating temperatures, as well as the fusing temperatures, will vary according to the compounding, and the time required to bring the molds up to preheating temperature is dependent upon a number of factors such as the gelling temperature of the particular casting material and the heat conductivity of the mold.

What is claimed is:

1. The process of making hollow articles from a liquid mixture of vinyl resin and a plasticizer therefor, comprising the steps of preheating a hollow sectional mold to the gelling temperature of said liquid mixture, depositing a measured charge of the said mixture in said mold, closing the mold with the charge retained therein, rotating the mold in a multiplicity of planes to distribute the charge over the entire inner surface of the mold cavity until it has completely gelled into a uniform layer, then applying heat to the closed mold to raise its temperature sufficiently to fuse the gelled layer against the inner surface of the mold, cooling the mold to reduce the temperature of the layer below its fusing temperature, and opening the mold and removing the article therefrom.

2. The process of making hollow articles from a liquid mixture of vinyl resin and a plasticizer therefor, comprising the steps of preheating a hollow sectional mold to the gelling temperature of said liquid mixture, depositing within said mold a measured charge of said mixture of less volume than the volume of the mold, closing the mold within the charge retained therein, rotating the mold in a multiplicity of planes while the mold is at said gelling temperature to distribute the charge over the entire inner surface of the mold cavity until it has been completely gelled into a layer of uniform thickness, then applying heat to the closed mold to raise its temperature sufficiently to fuse the gelled layer, cooling the mold to reduce the temperature of the layer below its fusing temperature, and opening the mold and removing the article.

3. The process of making hollow articles from a deaerated liquid mixture of a vinyl resin and plasticizer therefor, comprising the steps of preheating a hollow sectional non-porous mold to slightly above the gelling temperature of said mixture, depositing within said mold a measured charge of said mixture of less volume than the volume of the mold, closing the mold and maintaining it closed to prevent the escape of the deaerated mixture and air from the mold cavity, rotating the closed mold in a multiplicity of planes for a sufficient time to distribute the charge of deaerated mixture over the entire inner surface of the mold cavity until it has completely gelled into a layer of uniform thickness, then applying sufficient heat to said mold to fuse the gelled layer, cooling the mold to cool said layer below fusing temperature, and opening the mold and removing the article.

4. The process of making hollow articles from a liquid mixture of a resinous material and a plasticizer, comprising the steps of preheating a hollow sectional non-porous mold to substantially the gelling temperature of said mixture, depositing a measured charge of said mixture in said hollow sectional non-porous mold, the charge being less in volume than the volume of the mold, closing the mold to prevent the escape of the mixture from the mold cavity, maintaining the closed mold at the gelling temperature of said mixture and at the same time revolving it in a plurality of planes for a sufficient period to cause the mixture to gel completely as a layer of uniform thickness over the entire inner surface of the mold, then further heating the mold to fuse the gelled layer, cooling the mold to cool said layer below fusing temperature, and opening the mold and removing the article therefrom.

5. In a process of making hollow articles from a liquid mixture of a resinous material and a plasticizer, the steps of preheating a hollow mold to the gelling temperature of said mixture, depositing a measured charge of said mixture in said mold, closing the mold with the charge retained therein, rotating the closed mold in a plurality of planes to distribute the charge uniformly over the surface of the mold cavity until it has gelled into a layer of uniform thickness, and then heating the mold to fuse the gelled layer.

6. In a process of making hollow articles from a liquid mixture of a resinous material and a plasticizer, the steps of preheating a hollow mold to the gelling temperature of said mixture, depositing within said mold a measured charge of said mixture of less volume than the volume of the mold, closing the mold with the charge retained therein, rotating the closed mold in a plurality of planes to distribute the charge uniformly over the entire surface of the mold cavity until it has completely gelled into a layer of uniform thickness, and then applying additional heat to the mold to fuse the gelled layer.

7. In a process of making hollow articles from a liquid mixture of a resinous material and a plasticizer, the steps of preheating a hollow sectional mold to substantially the gelling temperature of said mixture, depositing a measured charge of said mixture in said hollow sectional mold, the charge being less in volume than the volume of the mold, closing the mold with the charge retained therein, maintaining the closed mold at the gelling temperature of said mixture and at the same time revolving it in a plurality of planes for a sufficient period to cause the mixture to gel completely as a layer of uniform thickness over the entire inner surface of the mold, and then further heating the mold to fuse the gelled layer.

References Cited in the file of this patent

UNITED STATES PATENTS

| Number | Name | Date |
|---|---|---|
| 1,846,999 | Eaton | Feb. 23, 1932 |
| 1,873,535 | Broadwell | Aug. 23, 1932 |
| 2,629,131 | Martin | Feb. 24, 1953 |
| 2,629,134 | Molitor | Feb. 24, 1953 |